(No Model.)
G. A. BYOR.
HANDLE.
No. 406,426. Patented July 9, 1889.
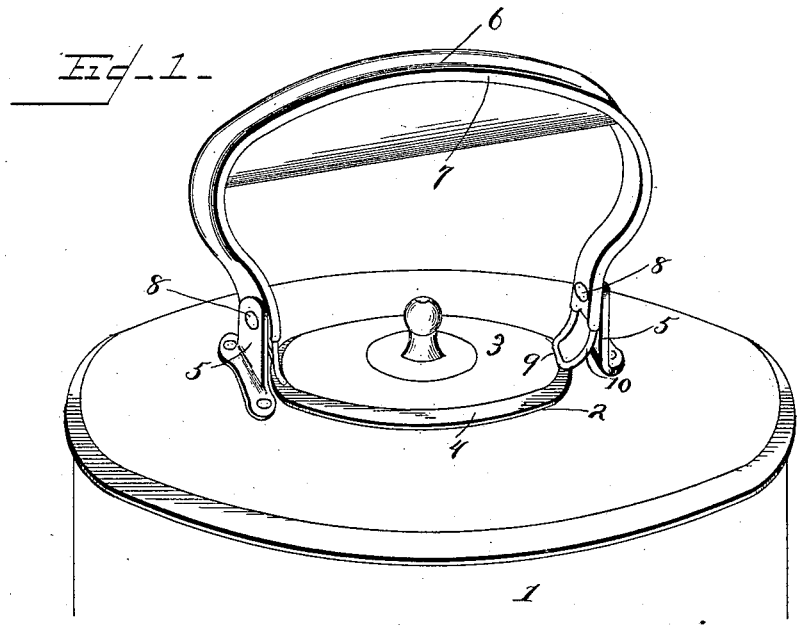
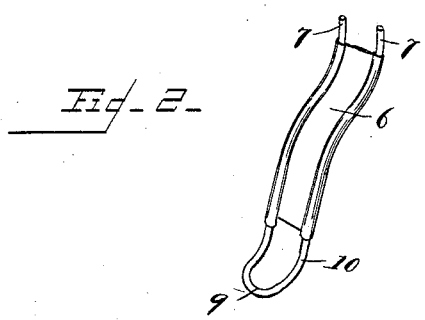
Witnesses:
Geo. E. Frech.
N. S. Duvall
Inventor,
Gustav A. Byor.
By his Attorneys

UNITED STATES PATENT OFFICE.

GUSTAV ADOLPH BYOR, OF EDGAR, NEBRASKA.

HANDLE.

SPECIFICATION forming part of Letters Patent No. 406,426, dated July 9, 1889.

Application filed September 18, 1888. Serial No. 285,722. (No model.)

*To all whom it may concern:*

Be it known that I, GUSTAV ADOLPH BYOR, a citizen of the United States, residing at Edgar, in the county of Clay and State of Nebraska, have invented new and useful Improvements in Handles, of which the following is a specification.

This invention has relation to handles for kettles, tea-urns, coffee-pots, and other vessels employing removable lids; and among the objects in view are to provide a neat and convenient swinging handle or bail so constructed as to act as a lock to the cover when in a certain position, and thereby prevent its accidental displacement, and to release said cover when in other positions.

Other objects and advantages of the invention will hereinafter appear, and the novel features will be particularly pointed out in the claim.

Referring to the drawings, Figure 1 is a perspective of a vessel provided with a handle constructed in accordance with my invention; the same being shown in a locked position, and Fig. 2 is a detail in perspective of one of the lower locking ends of the handles.

Like numerals of reference indicate like parts in both the figures of the drawings.

1 represents an ordinary vessel, having the opening 2, in which is fitted the removable cover 3, provided with the usual annular flange 4, overlapping the edges of the opening. At each side of the opening 2 there projects upwardly from the vessel a perforated handle-supporting lug or ear 5.

6 represents a handle or bail, formed of sheet metal, and provided at each side with longitudinally-disposed stiffening-wires 7. The metal of the handle preferably terminates short of the vessel, and is pivoted in the ears 5 by rivets 8.

The stiffening-wires 7 are preferably formed in a single piece, so bent as to serve the purpose in view, and the edges of the metal handle are beaded over the same in the usual manner.

The wire 7 is formed considerably longer than the metal handle, and the loop ends 9 project beyond the ends of the handle, and are bent inwardly, as at 10, to form yielding binding tongues or loops arranged in a line with the handle, and adapted, when the handle is raised, to bind upon the annular flange 4 of the cover, and thus secure the cover in position during the operation of emitting the contents of the vessel. By throwing the handle to either side the cover is released and may be removed.

What I claim is—

The vessel 1, having opening 2, and opposite perforated ears 5, in combination with the cover 3, mounted in the opening and having the overlapping annular flange 4, and the handle 6, pivoted, as at 8, to the ears, and having the stiffening-wires 7 projecting beyond the handle and terminating in loops 9, bent, as at 10, for taking over the flange of the cover, substantially as specified.

In testimony that I claim the foregoing as my own I have hereto affixed my signature in presence of two witnesses.

GUSTAV ADOLPH BYOR.

Witnesses:
F. F. CAIGER,
D. D. NYE.